United States Patent [19]

Shimizu

[11] Patent Number: 4,682,177

[45] Date of Patent: Jul. 21, 1987

[54] DISPLAY FOR RADARS OR SONARS

[76] Inventor: Hajime Shimizu, 68, Yamate-cho, Naka-Ku, Yokohama-shi, Kanagawa-ken, Japan

[21] Appl. No.: 687,421

[22] Filed: Dec. 28, 1984

[30] Foreign Application Priority Data

Jul. 7, 1983 [JP] Japan ................................ 58-122386

[51] Int. Cl.⁴ ............................................. G01S 7/26
[52] U.S. Cl. ..................................... 342/176; 367/109; 116/286
[58] Field of Search ..................... 343/5 R, 7.9; 116/286–288, DIG. 26, DIG. 36; 342/175–186; 367/109–111

[56] References Cited

U.S. PATENT DOCUMENTS

| 3,713,143 | 1/1973 | Blitz | 343/5 R |
| 3,754,248 | 8/1973 | Casse et al. | 343/5 R |
| 3,803,597 | 4/1974 | Kirner | 343/5 R |

FOREIGN PATENT DOCUMENTS

| 2111920 | 9/1972 | Fed. Rep. of Germany | 343/5 R |
| 2302087 | 9/1973 | Fed. Rep. of Germany | 367/109 |
| 0195058 | 6/1983 | Japan | 343/5 R |
| 1420746 | 1/1976 | United Kingdom | 343/5 R |

Primary Examiner—T. H. Tubbesing
Assistant Examiner—Bernarr Earl Gregory
Attorney, Agent, or Firm—Wenderoth, Lind & Ponack

[57] ABSTRACT

An improved display for visually presenting the reflected wave information of a sonar or radar by a plurality of displaying light-emitting elements supported on a rotating member. The display comprises a light-receiving unit formed in said rotating member on its rotating axis and including a light-receiving element for receiving an optical signal regarding said reflected wave information and sending it to said plurality of displaying light-emitting elements and a light-emitting unit having a light-emitting opening provided opposite to said light-receiving opening on a fixed member on the rotating axis of said rotating member and including a light-emitting element provided in a fixed member for sending said optical signal to said light-receiving element.

8 Claims, 7 Drawing Figures

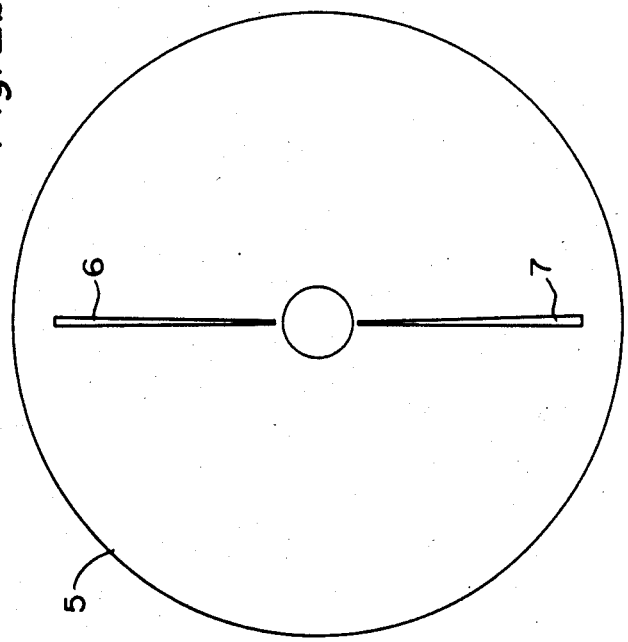
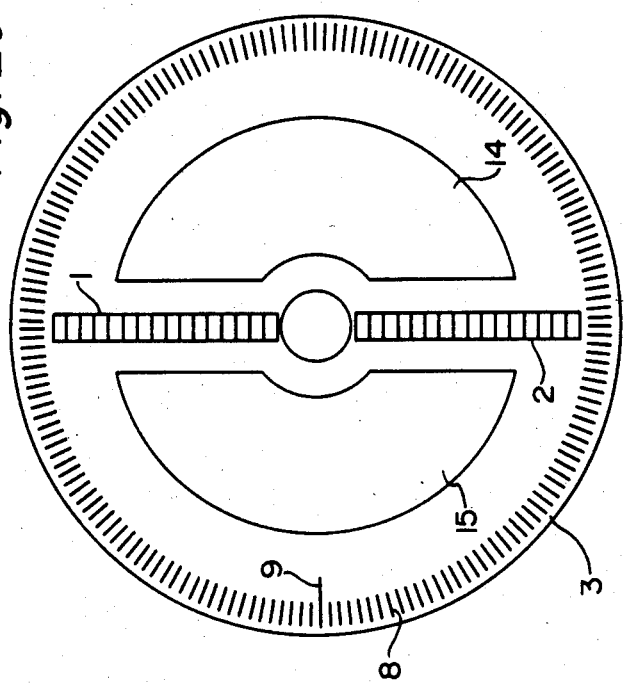
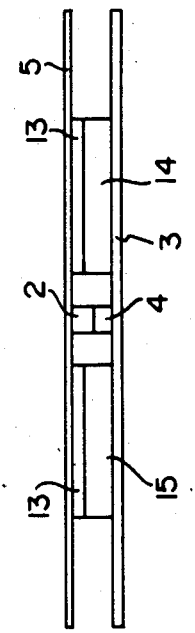

DISPLAY FOR RADARS OR SONARS

BACKGROUND OF THE INVENTION

1. Field of the Invention

This invention relates to a display for sonars or radars, and more specifically, to a display for displaying the reflected wave information of a sonar or radar by a plurality of displaying light-emitting elements provided in a rotating member.

2. Description of the Prior Art

Cathode ray tubes have previously been used as displays for radars, scanning sonars, searchlight sonars, etc. A high-precision display based on a cathode ray tube is large-sized because of its inclusion of a mechanical driving section, and its weight is large enough to affect the mechanical strength designing of a place of its installation. Of course, such a display is not portable. On the other hand, a display built positively in a small size has an insufficient displaying ability and is difficult to view.

Attempts have therefore been made to use light-emitting elements such as LED as a display. One example is the technique described in Japanese Patent Publication No. 52268/1981. The use of light-emitting elements offers a solution to the problem of light-weight and small size in such displays. In a cathode ray tube display, a deflecting coil is rotated and information is received by a cathode in a fixed section. In a display based on light-emitting elements, information to be displayed should be transmitted to the light-emitting elements provided in a rotating member, and therefore, a mechanical contact portion should be provided in an electrical system.

The technique described in the above-cited Japanese Patent Publication No. 52268/1981 is one example of this type. In the device shown in it, a fixed disc having fixed contact pieces is disposed opposite to a rotating disc having light-emitting elements, and information received is transmitted from the fixed contact pieces of the fixed disc to the light-emitting elements of the rotating disc through a brush fixed to the rotating disc. The rotating speed of the rotating disc is about 20 to 30 revolutions per second, and the brush slides over the individual fixed contact pieces at a high speed. Hence, the on-off speed is fast. Because of this and also of the elasticity of the brush itself, chattering occurs at a very high frequency. In particular, when the light-emitting elements are light-emitting diodes, the persistence time is extremely short, and therefore the chattering makes it difficult to view the display and causes the fatigue of eyes. Furthermore, because of the high-speed sliding of the brush, the brush undergoes wear. The wear of the brush and the chattering roughen the surface of the contact pieces, and the service lives of the brush and the fixed contact pieces are shortened. This facilitates the occurrrence of the chattering.

The method of current collection by brushes has a mechanical limit when it is desired to increase its precision by increasing the density of arraying light-emitting elements. On the other hand, attempts to decrease the size of such a device while maintaining the same precision have not produced entirely satisfactory results because of the brushes and incidental parts.

SUMMARY OF THE INVENTION

The present invention has been accomplished in view of the above state of the art.

It is an object of this invention to provide a light-weight, small sized and high-precision display for radars, scanning sonars, searchlight sonars, etc.

Another object of this invention is to provide an easily viewable display for radars or sonars, which has no electrical connecting part mechanically contactng a signal system, and in which noises such as chattering do not affect displaying.

Still another object of this invention is to provide a display for radars or sonars which has a long service life.

Yet another object of this invention is to provide a display for radars or sonars which can properly display digital signals of received information.

The above and other objects will become apparent from the following description.

In accordance with this invention, the above and other objects are achieved by a display for visually presenting the reflected wave information of a sonar or radar by a plurality of displaying light-emitting elements supported on a rotating member, said display comprising a light-receiving unit formed in said rotating member on its rotating axis and including a light-receiving element for receiving an optical signal regarding said reflected wave information and sending it to said plurality of displaying light-emitting elements and a light-emitting unit having a light-emitting opening provided opposite to said light-receiving opening on a fixed member on the rotating axis of said rotating member and including a light-emitting element provided in a fixed member for sending said optical signal to said light-receiving element.

BRIEF DESCRIPTION OF THE ACCOMPANYING DRAWINGS

The above and other objects are accomplished by the novel features of the present invention which will become apparent from the following description having reference to the accompanying drawings wherein:

FIG. 2a is a front elevation of that portion of the display which includes a base plate and a slit plate;

FIG. 2b is a top plan view of the slit plate shown in FIG. 2a;

FIG. 2c is a top plan view of the base plate of FIG. 2a on which displaying light-emitting elements, etc. are provided;

DETAILED DESCRIPTION OF PREFERRED EMBODIMENTS

The first embodiment of the present invention will be described below with reference to FIGS. 1 to 3.

Figure 1:
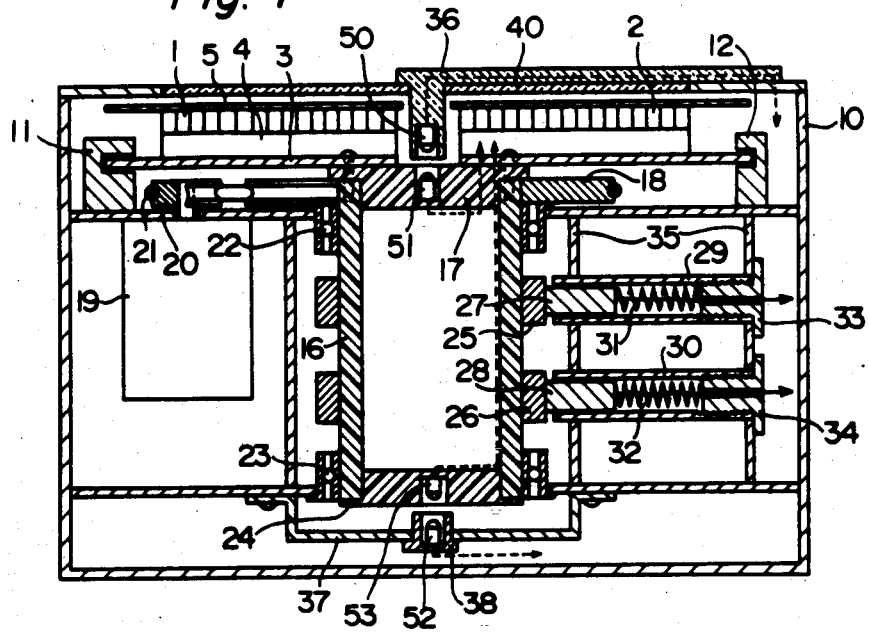
FIG. 1 is a partial sectional view of the display of this invention in accordance with a first embodiment.

FIG. 1 is a sectional view of the first embodiment of this invention (some parts including a motor are omitted). FIGS. 2a, 2b and 2c are views showing parts of this embodiment. In the drawings, the reference numerals 1 and 2 represent an array of displaying light-emitting elements such as light-emitting diodes fixed through a spacer 4 to a disc-like base plate 3 having a central circular hole. Generally, the base plate 3 is desirably a print base plate, and the light-emitting element arrays 1 and 2 should also be electrically connected to the base plate 3. A black delustered slit plate 5 whose surface is non-reflecting is fixed to the upper parts of the displaying light-emitting element arrays 1 and 2. To stabilize this fixation, a supporting member 13 (FIG. 2a) of a plastic material or the like is preferably interposed between the base plate 3 and the slit plate 5. In this embodiment, a supporting member 13 is provided between the slit plate 5 and an power supply circuit 14 and between the slit plate 5 and a received information processing circuit 15, as shown in FIG. 2a. As shown in FIG. 2b, slits 6 and 7 of the slit plate 5 have an angle of ±1 degree, namely a width of 2 degrees, about the rotating axis passing through the center of the slit plate 5. Furthermore, as shown in FIG. 2c, angle detecting slits 8 are provided circumferentially on the peripheral portion of the base plate 3 at intervals of 2 degrees with the rotating axis passing through the center of the base plate 3 as a standard. One of the angle detecting slits 8 is formed in a larger length than the others, and is used as a synchronism detecting slit 9. The angle detecting slits 8 and the synchronism detecting slit 9 permit detection of the relation between the angles of the light-emitting element arrays 1 and 2 and the angle of an antenna by means of an angle detecting sensor 11 and a synchronism detecting sensor 12 fixed to a casing 10. In this embodiment, the angle detecting slits 8 and the synchronism detecting slit 9 are formed in the base plate 3, but if desired, they may be formed in the slit plate 5. The angle detecting sensor 11 and the synchronism detecting sensor 12 are located on the side of the slit plate 5. In this embodiment, photocouplers are used as the angle detecting sensor 11 and the synchronism detecting sensor 12, but proximity switches may be used as desired. The power supply circuit 14 and the received information processing circuit 15 are disposed on the base plate 3 so as to provide an equal balance on the surface of the base plate 3.

The base plate 3 is fixed to a rotating cylindrical member 16 by an upper sealing member 17 by means of screws and the like. A large pulley 18 is attached to the rotating cylindrical member 16, and a belt 21 is stretched between it and a small pulley 20 in a small-sized motor 19 secured to the casing 10. At the upper and lower parts of the rotating cylindrical member 16, an upper bearing 22 and a lower bearing 23 permitting free rotation of the rotating cylindrical member 16 and restricting its vertical movement are disposed between the upper and lower parts of the cylindrical member 16 and the casing 10. A lower sealing member 24 is fixed to the lower end portion of the rotating cylindrical member 16. Two slip rings (current collecting rings) 25 and 26 are inserted into, and fixedly secured to, the rotating cylindrical member 16. When the rotating cylindrical member 16 is made of a conductor such as metal, an insulation may be interposed between the slip rings 25 and 26. This is not necessary, however, when the rotating cylindrical member 16 is made of a synthetic resin, an insulator or the like. Brushes 27 and 28 are provided in contact with the slip rings. The contacting pressure is adjusted by springs 31 and 32 within brush guides 29 and 30 and brush fixing members 33 and 34. The brush guides 29 and 30 are fixed to the casing 10 by means of a guide holding member 35.

The current conducted to the rotating cylindrical member 16 by the slip rings 25 and 26 is conducted to the power supply circuit 14 on the base plate 3 by means of a conductor extending upwardly over the inner surface of the rotating cylindrical member 16 and thus supplies power to the received information processing circuit 15.

Figure 3:
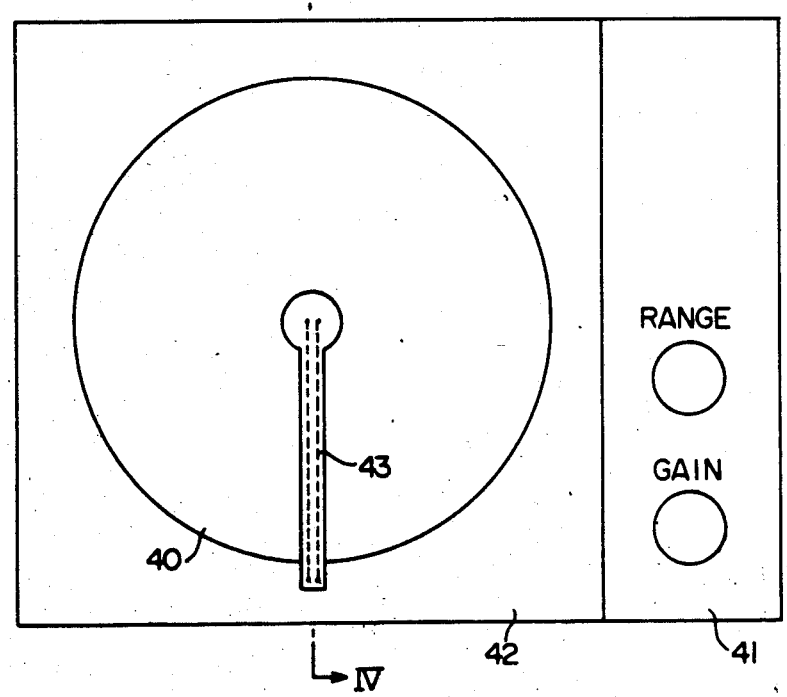
FIG. 3 is a top plan view of the front panel of he display shown in FIG. 1.

FIG. 3 shows the front surface of the display in accordance with the present embodiment comprising a transparent plate 40 and an operating panel 41. Generally, an upper closure 42 is formed of a non-transparent material such as metal and plastics. A conductor 43 is formed, for example, of a clear paint, a fine wire, a conductor foil, or a thin metal film, and conducts the synchronism signal of the received information to a light-emitting element 50 within an element holder 36 (FIG. 1).

An optical signal from the light-emitting element 50 is received by a light-receiving element 51 provided centrally in the upper sealing member 17 at the upper end portion of the rotating cylindrical member 16, and conducted to the received information processing circuit 15. A light-receiving element 53 is also disposed at the center of the lower sealing member 24 at the lower end portion of the rotating cylindrical member 16, and conducts received information composed of an optical signal, such as reflected waves of electric wave beams of a radar from a light-receiving element 52 disposed opposite to the light-receiving element 53 within an element holder 38 fixed to a light-emitting element fixing member 37. The information is further conducted to the received information processing circuit 15 on the base plate 3.

Since the light-emitting element 50 and the light-receiving element 51, and the light-emitting element 52 and the light-receiving element 53, respectively, are disposed concentrically to each other, their coupling relation remains unchanged irrespective of the rotation of the rotating cylindrical member 16.

In a modified embodiment, the light-emitting element 50 is fixed to a desired site of the casing 10, and light may be conducted to the holder 36 by means of a light transmitting material such as an optical fiber. Specifically, in the aforesaid embodiment, the light-emitting surface itself of the light-emitting element 50 forms a light-emitting opening, and the light-emitting element 50 is provided in a fixed member, i.e. the holder 36, so that its light-emitting opening faces the light-receiving surface (light-receiving opening) of the light-receiving element 51 on the rotating axis of the rotating cylindrical member 16. Instead of this embodiment, it is possible to fix the light-emitting element 50 to a desired site of the casing 10, and positioning one end of an optical fiber (not shown) in proximity to the light-emitting surface of the light-emitting element 50 and providing the other end (light-emitting opening) of the optical fiber opposite to the light-receiving surface (light-receiving opening) of the light-receiving element 51. Likewise, it is possible to fix the light-receiving element 51 to a desired site of the rotating cylindrical member 16, positioning one end of the optical fiber (not shown) in proximity to the light-receiving surface of the light-receiving element 51, and positioning the other end (light-receiving opening) of the optical fibers opposite to the light-emitting surface (light-emitting opening) of the light-emitting element 50. If further required, both of the light-emitting element 50 and the light-receiving element 51 may be combined with the optical fiber. The light-emitting element 52 and the light-receiving element 53 provided at the lower portion in FIG. 1 may also be disposed in combination with the optical fiber.

Any of the coupling relation between the light-emitting element 50 and the light-receiving element 51 and the coupling relation between the light-emitting element 52 and the light-receiving element 53 may be selected for the synchronizing signal of the received information or for the received information composed of reflected waves. It is also possbile to omit one of the coupling relations between the light-emitting element and the light-receiving element and to place the synchronizing signal on the received information composed of reflected waves. When the upper light-emitting element 50 and light-receiving element 51 are omitted, the holder 36 and the conductor 43 on the front surface become unnecessary, and the front surface presents a good-looking appearance.

Figure 4:
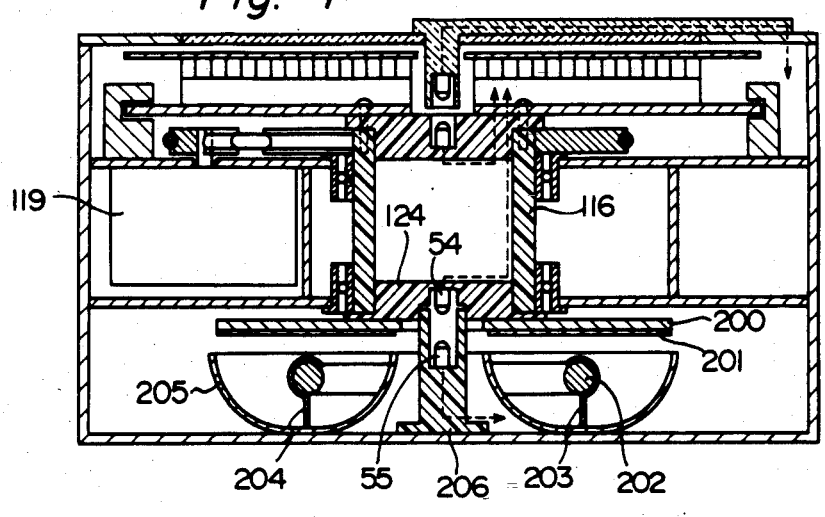
FIG. 4 is a partial sectional view of the display of the invention in accordance with a second embodiment.

FIG. 4 shows a sectional view (some parts including a motor are omitted) of another embodiment of the invention in which power is supplied by solar cells. Basically, the power supply by the brushes 27 and 28 and the slip rings 25 and 26 in FIG. 1 is replaced by the power supply by solar cells 201 and a light source 202.

The difference of the embodiment shown in FIG. 4 from that in FIG. 1 will be described. A rotating cylindrical member 116 is shorter than in the first embodiment since it is not necessary to attach slip rings and brushes to it. A solar cell securing plate 200 having solar cells 201 fixed thereto annularly is secured to a lower sealing member 124. In view of the need to connect the solar cells 201 by wiring, the securing plate 211 is desirably a wiring board like a print circuit board. A light source 202 supported by a plurality of light source holding members 203 and 204 is disposed below the solar cells 201. Hence, the solar cells 201 directly receive the light energy of the light source 202. A reflecting mirror 205 is provided on that side of the solar cells 201 which is opposite to the light source 202, and the solar cells 201 also receive the light reflected by the reflecting mirror 205. The light source 202 may be a fluorescent lamp such as an annular electric bulb or a discharge lamp such as a mercury lamp or a sodium lamp, or an incandescent lamp.

A light-receiving element 54 is fixed to the lower sealing member 124 on its axis of rotation, and a light-emitting element 55 is fixed to the inside of an element holder 206. Between the light-receiving element 54 and the light-emitting element 55, information is exchanged by optical coupling. When the light source 202 is a discharge lamp or the like, noises occur. Hence, optical coupling of the light-receiving element and the light-emitting element 55 should be carried out so that the light from the light source 22 should not come between the optically coupled members.

In the embodiment of FIG. 4, the solar cells 201 are provided in the solar cell securing plate 200 in a flat ring-like shape. Alternatively, they may be provided cylindrically by fixing them to the outside surface of the rotating cylindrical member 16 as in the embodiment of FIG. 1. Needless to say, the light source is provided around the rotating cylindrical member 16.

In the embodiment shown in FIG. 4, the electric power is obtained by using light energy, but if desired, it is possible to obtain it by electromagnetic energy. Specifically, the job of the small-sized motor 110 can be also utilized also for power generation. This may be achieved by providing a coil in the rotating cylindrical member 216 and positioning a magnet in the fixed member close to the coil. Since the resulting electric current is an alternate current, it should be commutated.

In any case, since according to this invention an electrical signal is converted to an optical signal by the light-emitting element and the optical signal is converted to an electrical signal by the light-receiving element and this is done by the coupling relation between the light-emitting element and the light-receiving element disposed on the axis of rotation, the display of this invention can be used without mechnical coupling errors and a decrease in the amount of information of the transmitted signal.

Figure 5:
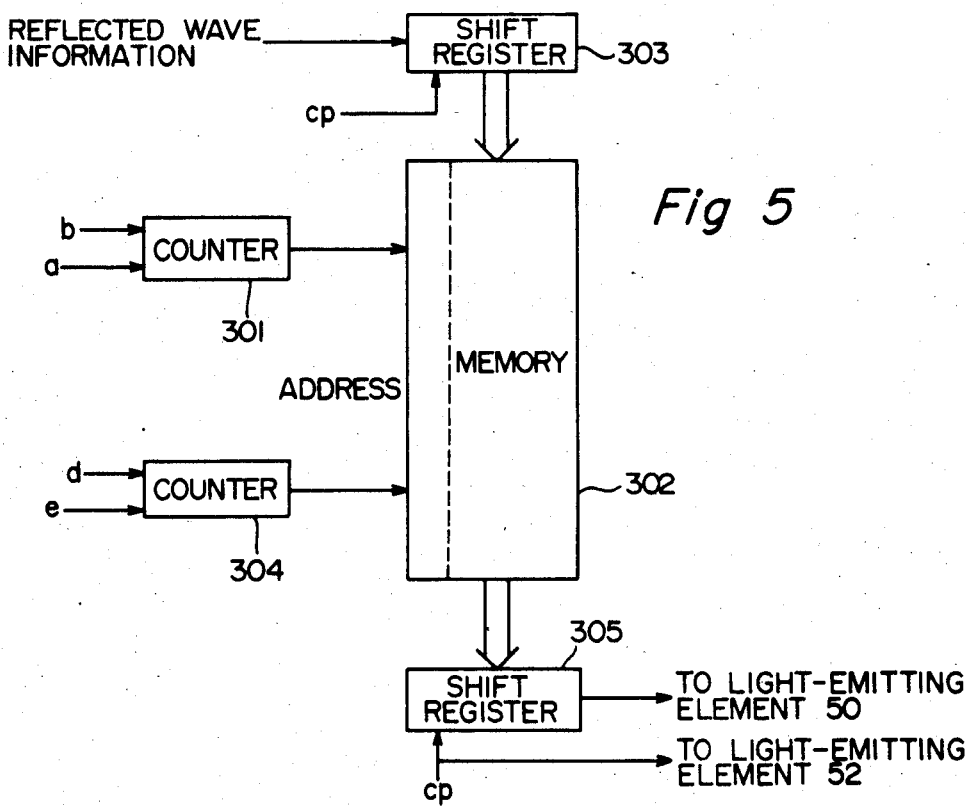
FIG. 5 is a diagram of an electrical system for actuating the first embodiment of the display of the invention.

Now, with reference to FIGS. 1 and 5, the electrical system in one embodiment of the present invention will be described. FIG. 5 shows an embodiment in which the display of this invention is used for a radar. A wave sending and receiving antenna and a second slit plate (not shown) fixed to the rotating shaft of the antenna are turned by a motor which is not in synchronism with a motor for display. A synchronism detecting output and an angle detection output obtained from the slits of the second slit plate are the outputs of a synchronism detecting sensor and an angle detecting sensor having a similar structure as those used for the first slit plate 5 (FIG. 2b) of the first slit plate of the display. By the antenna angle detecting output a, electric waves are projected and information regarding the angle of the wave sending antenna is obtained. Specifically, every time the antenna turns by an angle of 2 degrees, one pulse is obtained as an antenna angle detecting output. The antenna angle detecting output a is also used as a count pulse of a counter 301 for writing address. The counter 301 is cleared by a synchronism detecting output b, and counts up by gaining the angle detecting output a. The value on the counter 301 is used for address designation of a memory 302. The reflected waves are received by the wave receiving antenna and in synchronism with a clock pulse CP, the reflected wave information is temporarily memorized serially in a shift register 303 and the contents of the shift register 303 are written in an arbitrary address of the memory 302 selected by the counter 301. The action of writting the reflected wave information written in the memory 302 can be retrieved at any desired time, and displayed as shown below.

On the other hand, the angle detecting output e and the synchronism detecting output d of the slit plate 5 revolved by the small-sized motor 19 (FIG. 1) for display are obtained. A counter 304 for read-out address is cleared by the synchronism detecting output 4. The counter 304 counts up by gaining the angle detecting output e. Accordingly, every time the displaying light-emitting element arrays 1 and 2 turn by an angle of 2 degrees, the reflection wave information in the memory 302 is read out by using the value of the counter 304 as an address and outputted parallely into a shift register 305. The information within the shift register 305 receives the clock pulse CP and is conducted to the light-emitting element 50 as serial information. Likewise, the clock pulse CP is conducted to the light-emitting element 52. The light-emitting element 50 transmits the information to the light-receiving element 51, and the light-emitting element 52, to the light-receiving element 53. The information is then sent to the received information processing circuit 15 where the serial information is converted to parallel information and displayed by the displaying light-emitting element arrays 1 and 2 through an interface circuit.

Since the display of this invention can be constructed in light weight and small size without providing a mechanical contacting portion in the electrical path of a reflected wave information system, it is possible to remove effects of noises during displaying. Furthermore, because of the absence of the aforesaid mechanically contacting portion, there is no part which undergoes mechanical wearing, and the display can have a long service life.

Furthermore, since according to this invention, the reflected wave information can be transmitted by optical coupling, the amount of the transmitted signal can be increased, and not only the displaying of reflected waves as in the prior art but also the difference between one ouput displayed by the light emitting elements and the next one can be sent by optical coupling. The difference can be displayed by light-emitting elements of a different color.

In the embodiments of this invention, two arrays of displaying light-emitting elements are used. Since the amount of transmitted signals can be large owing to optical coupling, the number of light-emitting element arrays may be increased. If the number of the light-emitting element arrays is increased, the flickering phenomenon is reduced, and the display is easy to view with less fatigue of the eyes. That the amount of information which can be sent by optical coupling is large means that the two pairs of optical coupling means in the embodiments can be decreased to one pair. Furthermore, if a signal is used as a multivalue, one pair of optical coupling means can transmit information in an amount larger than that which can be transmitted by two pairs of optical coupling means using a binary signal. Hence, the optical coupling on the side of the front panel can be omitted. Even if the number of displaying light-emitting element arrays is increased, they can cope with the amount of information, and the precision of displaying can be increased.

Since the power consumed by the light-emitting element arrays is small, the amount of power to be supplied thereto can be small. The power can be obtained by solar cells or electromagnetic power generating means. Thus, the electrical circuit system can do without any mechnical contacting part, and noises in the displayed information can be prevented.

According to the present invention, the provision of a mechanical contacting part can be omitted by using the displaying light-emitting elements and solar cells. The display of this invention can be further reduced in size if the rotation of the substrate and the slit plate by the small-sized motor is changed to the direct driving of the base plate and the slit plate.

Since the display of this invention is easy to build and the cost of materials is low, it can be provided at low costs.

What is claimed is:

1. A display apparatus for visually presenting the reflected wave information of a sonar or radar, comprising:
    a rotating member;
    a plurality of light-emitting display elements supported on said rotating member;
    a light-receiving means on said rotating member having a light-receiving opening directed axially along the rotating axis of said rotating member for receiving an optical signal regarding the reflected wave information and sending it to said plurality of light-emitting display elements;
    a fixed member adjacent said rotating member; and
    light-emitting means on said fixed member having a light-emitting opening in spaced opposed relation to and coaxial with said light-receiving opening on the rotating axis of said rotating member for sending the optical signal to said light-receiving means.

2. The display apparatus as claimed in claim 1 wherein said light-receiving means is a light-receiving element, and said light-receiving elements has a light-receiving surface which constitutes said light-receiving opening.

3. The display apparatus as claimed in claim 1 wherein said light-emitting means is a light-emitting element and said light-emitting element has a light-emitting surface which constitutes said light-emitting opening.

4. The display apparatus as claimed in claim 1 in which said light-receiving means comprises a light receiving element and an optical fiber having one end disposed in proximity to the light-receiving surface of said light-receiving member, and having the other end disposed on the rotating member directed axially on the rotating axis and constituting said light-receiving opening.

5. The display apparatus as claimed in claim 1 in which said light-emitting means comprises a light-emitting element and an optical fiber having one end disposed in proximity to the light-emitting surface of said light-emitting member, and having the other end disposed on the fixed member directed axially on the rotationg axis of said rotating member and constituting said light-emitting opening.

6. The display apparatus as claimed in claim 1 further comprising power supply means on said fixed element for supplying power for said plurality of light-emitting display elements and for transmitting the power from said fixed member to said rotating member without any mechanical contact therebetween.

7. The display apparatus as claimed in claim 6 wherein said power supply means comprises solar cells disposed on said rotating member and a light source disposed on said fixed member.

8. The display apparatus as claimed in claim 6 wherein said power supply means comprises a winding disposed on said rotating member and a magnet disposed on said fixed member.

* * * * *